United States Patent [19]

Wehner et al.

[11] 4,328,021

[45] May 4, 1982

[54] THRESHOLD CART FOR FLAT GLASS FORMING APPARATUS AND METHOD OF USE

[75] Inventors: George O. Wehner, Bethel Park; Stephen J. Schultz; Ronald R. Zito, both of Pittsburgh, all of Pa.

[73] Assignee: PPG Industries, Inc., Pittsburgh, Pa.

[21] Appl. No.: 211,168

[22] Filed: Nov. 28, 1980

[51] Int. Cl.³ ............................................. C03B 18/16
[52] U.S. Cl. ........................................ 65/27; 65/99.2; 65/171; 65/172; 65/173; 65/182.5
[58] Field of Search .................. 65/27, 171, 172, 173, 65/182.5, 99.2

[56] References Cited

U.S. PATENT DOCUMENTS

| | | |
|---|---|---|
| 1,815,972 | 7/1931 | Gelstharp ............................. 65/171 |
| 3,083,551 | 4/1963 | Pilkington ............................. 65/32 |
| 3,220,816 | 11/1965 | Pilkington ............................. 65/99 |
| 3,539,321 | 11/1970 | Montgomery et al. ............. 65/99.2 |
| 3,843,346 | 10/1974 | Edge et al. ........................ 65/65 A |
| 3,854,922 | 12/1974 | Sensi et al. ........................... 65/172 |
| 4,062,666 | 12/1977 | Tilton ................................. 65/99 A |

Primary Examiner—Arthur D. Kellogg
Attorney, Agent, or Firm—Dennis G. Millman

[57] ABSTRACT

In a flat glass melting and forming installation, the threshold between a melting furnace and a forming chamber is supported on movable cart means to expedite installation and removal of the threshold.

11 Claims, 4 Drawing Figures

THRESHOLD CART FOR FLAT GLASS FORMING APPARATUS AND METHOD OF USE

BACKGROUND OF THE INVENTION

This invention relates to the float process for forming flat glass where molten glass is continuously delivered onto one end of a pool of molten metal, where it is drawn to a ribbon of desired thickness and withdrawn as a continuous ribbon of glass from the opposite end of the pool of molten metal. More particularly, this invention relates to improvements in the delivery section of such an apparatus.

In the various types of float forming processes used to manufacture flat glass, each employs a delivery section wherein molten glass from a melting furnace passes from contact with a refractory vessel into contact with the molten metal of the forming chamber. The final piece of refractory contacted by the glass in this zone has been variously termed the "lip" or "lipstone," particularly in association with the delivery arrangement shown in U.S. Pat. Nos. 3,083,551 and 3,220,816 of Pilkington, and as the "threshold" in connection with the delivery system of the type shown in U.S. Pat. No. 3,843,346 of Edge et al. The term "threshold" will be employed herein to include all such final refractory delivery pieces.

A threshold is inherently subject to erosion due to the continuous movement of molten glass over its surface at a relatively high velocity. However, erosion of a threshold can negatively affect the optical quality of the glass being produced. Therefore, in spite of efforts to employ durable, high quality refractories for the threshold, it is frequently necessary to replace a threshold before the need for other repairs justifies shutdown of a melting and forming installation. Shutting down such an installation can be very costly in terms of lost production since cooling and reheating each requires several days, and a return to stable production can sometimes require several weeks overall. Therefore, threshold changes are sometimes carried out without shutting down the melting furnace by blocking the flow of molten glass to the delivery zone. However, in order to enable maintenance workers to remove brickwork around the delivery zone and to engage the threshold with hoist means, it has heretofore been considered necessary to cool the float forming chamber. Unfortunately, this results in an excessive loss of production time since cooling and reheating the forming chamber requires much more time than is required for the replacement of the threshold. Accordingly, it would be highly desirable if a threshold could be removed and replaced while the forming chamber remains at substantially operating temperature.

SUMMARY OF THE INVENTION

The present invention provides an arrangement for easy removal and replacement of a threshold without requiring the melting furnace or the forming chamber to be cooled. As a result, threshold changes may be carried out with substantially less loss of production time.

The invention includes a cart upon which a portion of the delivery section, including the threshold, rests. The cart is mounted for horizontal movement transverse to the direction of glass travel. This cart serves as stationary support for the threshold during normal operations of the forming process, and when replacement of the threshold is desired, provides mobility to the threshold for withdrawal laterally from its mounted position. Because the threshold is carried on the cart means, direct access to the threshold is not required during replacement, and therefore the forming chamber may remain at substantially operating temperatures. Lifting means preferably coact with the cart to provide vertical adjustment thereto. In this manner, the threshold may be lifted from its mountings and, if necessary, lifted over sidewall portions of the forming chamber in order to be laterally withdrawn from its operating position. In the preferred embodiment full adjustability in three dimensions is provided to the threshold by additionally including means to translate the cart in the longitudinal direction (parallel to glass flow).

THE DRAWINGS

DETAILED DESCRIPTION

The preferred embodiment of the present invention will be described in connection with a specific threshold arrangement of the type described in U.S. Pat. No. 4,062,666 of Tilton, the disclosure of which is hereby incorporated by reference. It should be understood that the invention may be utilized in conjunction with other threshold designs.

Figure 1:
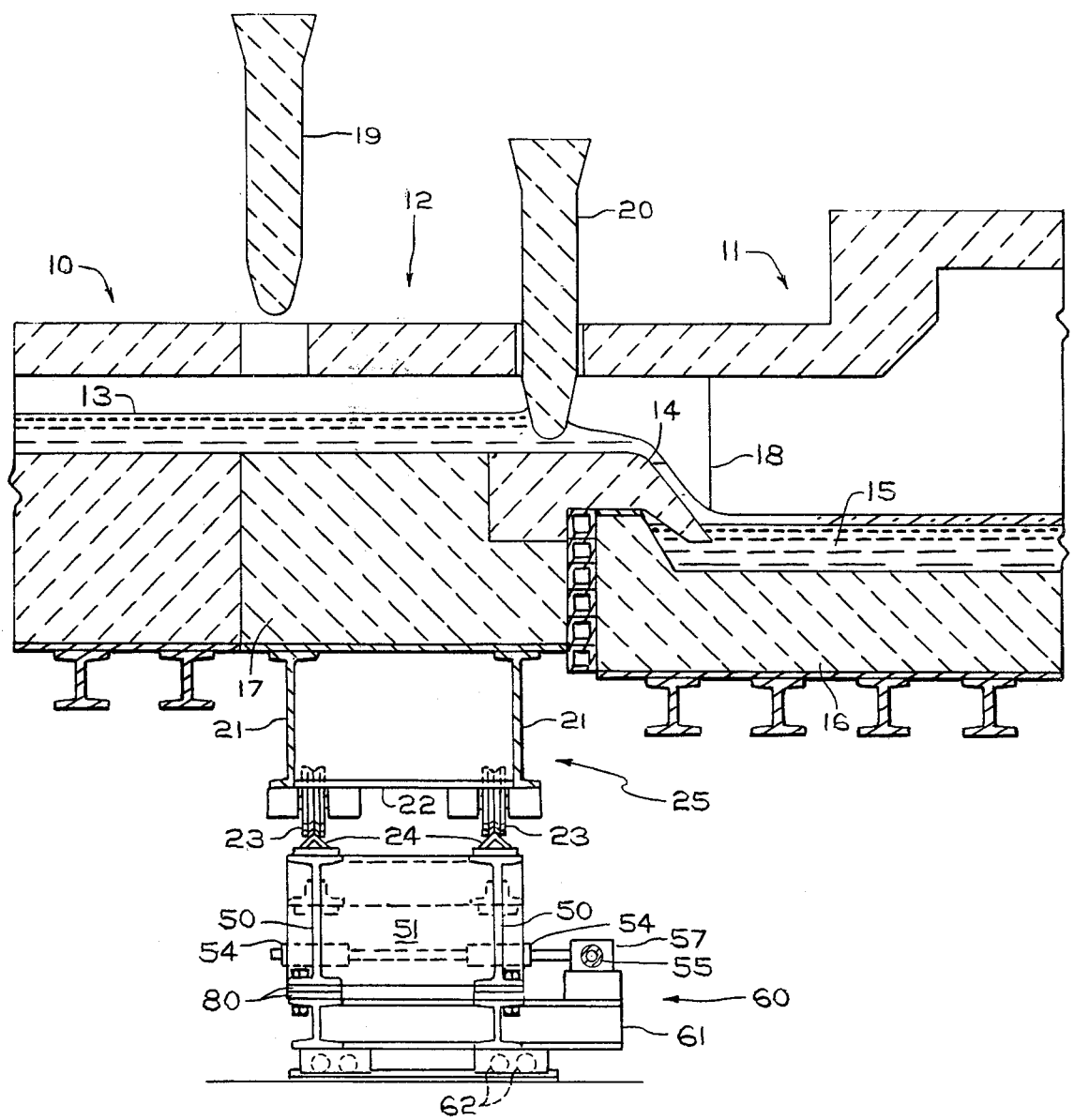
FIG. 1 is a cross-sectional view along the longitudinal center-line of a delivery zone of a float glass forming installation incorporating a threshold cart in accordance with the present invention.

In FIG. 1 there is shown in cross-section the exit end 10 of a glass melting furnace and the inlet end portion 11 of a float glass forming chamber. The transition between the melting furnace and the forming chamber comprises a delivery section 12, wherein the flow of molten glass 13 is metered by means of tweels 19 and 20. Thereafter, the glass flows over a threshold member 14, preferably of clear fused quartz, onto a pool of molten metal 15, which is usually tin but may also be copper or tin-copper mixtures and may include minor amounts of other metals such as iron. The metal is contained within a basin of refractory material 16 having side and end walls. The threshold 14 in the drawings bridges the end wall of the basin 16 and extends downwardly into the pool of molten metal 15. In addition to the threshold 14, the delivery section includes a refractory base 17 and side jamb blocks 18 which together define a flow channel for the molten glass passing from the melter to the forming chamber.

The threshold 14 is mounted on the refractory base 17 of the delivery section, which, in turn, rests on movable support means. The movable support is independent from the surrounding support means for the furnace and the float chamber so that the threshold and the associated structure of the delivery section may be moved as a unit. As shown in the drawings, it is preferred that the threshold be provided with the capability of being moved at least horizontally in the transverse direction to the direction of glass flow by supporting the delivery section on transversely movable cart means 25. A preferred embodiment of such a cart as depicted in the drawings may comprise transversely extending beams 21 and cross braces 22, and may be provided with V-grooved wheels 23 which ride on transversely extending tracks 24.

Figure 2:
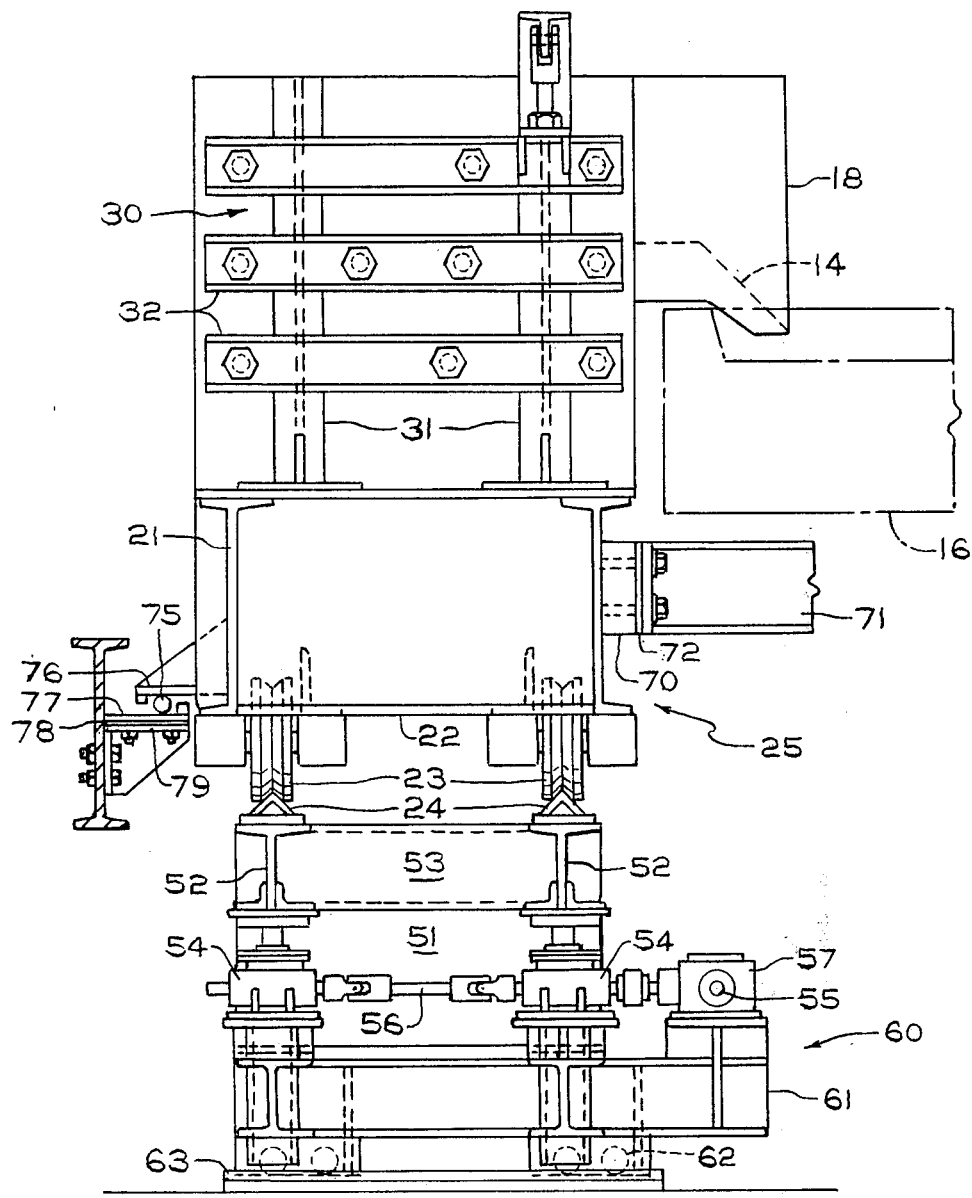
FIG. 2 is a side elevational view of a preferred embodiment of a threshold cart of the present invention.
Figure 3:
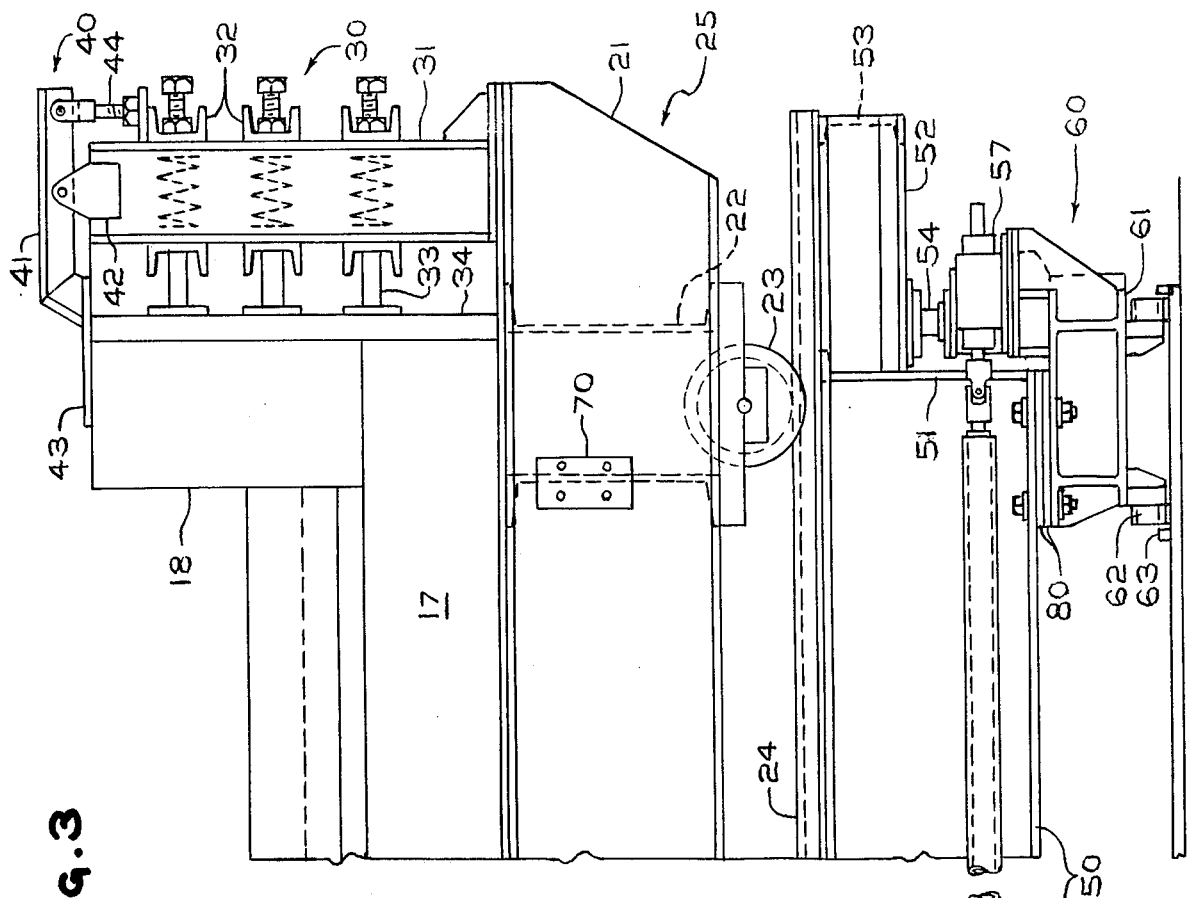
FIG. 3 is a front elevational view of the threshold cart of FIG. 2.

Referring now to FIGS. 2 and 3, bucking devices 30, as are conventionally employed to maintain the structural integrity of the delivery section, are affixed to the opposite ends of the beams 21. The bucking devices may comprise a framework of vertical beams 31 and horizontal beams 32, on which are mounted a number of spring-loaded pressure devices 33 which bear against the sides of the delivery zone through a refractory bearing plate 34. Assisting in maintaining the refractory pieces of the delivery section affixed to the cart are clamping devices 40 at the top of each bucking device 30. Each clamping device includes a lever arm 41 affixed by means of a pivot 42 to the top of a frame member 31. Downward force is transmitted through the lever arm 41 to a retaining plate 43 as established by threaded adjustment means 44 which applies upward force at the opposite end of the lever arm. The plate 43 may be a water-cooled pad.

In addition to the transverse mobility provided to the threshold by the cart, it is preferred to additionally provide vertical and longitudinal (parallel to the direction of glass flow) movement for the threshold. The specific embodiment depicted in the drawings includes means for providing such three-way adjustability. The rails 24 upon which the cart 25 rests are supported on a cart-raising bridge structure which may be comprised of a pair of beams 50 and cross braces 51. Extension beams 52 extending from the ends of beams 50 may be provided with cross braces 53 and are engaged by jacks 54 by means of which the cart-lifting bridge and the threshold cart thereon are provided with vertical adjustability. In the embodiment shown, a set of four jacks 54 are utilized and are linked together to act in unison by means of shafts 55 and 56 and gear boxes 57 (FIG. 2). As may be seen in FIG. 3, the jacks 54 are adapted to raise the lifting bridge to an elevation at which the tracks 24 for the cart are brought into horizontal alignment with a stationary track section 24' on the plant floor 58 adjacent to the delivery section. At the same time, the elevation provided by the jacks permits the lower extension of the threshold 14 to clear the side walls of the molten metal-containing basin 16, shown in phantom lines in FIG. 2, so that the threshold may be conveyed on the cart in the transverse direction without interference from permanent structural elements of the forming chamber.

The lifting bridge beams 50 may, in turn, rest upon a pair of dolly structures 60 which provide adjustability to the entire threshold supporting structure in the longitudinal direction. Each of the dolly structures 60 may be comprised of a frame 61 resting on a set of wheels 62 which roll between guide bars 63. Only a slight degree of longitudinal movement need be provided in order to permit the threshold and its associated structures to be pulled back from contact with adjacent elements so that the former may be moved freely in the transverse direction.

The mobility provided to the threshold by the lifting bridge and the dollies is utilized only during replacement of a threshold. During operation of the glass forming installation, the threshold is maintained stationary in a precisely determined location. Means for accurately and rigidly fixing the threshold in the desired location may be associated with the cart structure of the present invention. As shown in FIGS. 2 and 3, aligning blocks 70 may be affixed to the downstream side of one of the beams 21 of the threshold cart. When the threshold is brought into the desired location, the blocks 70 may be bolted to an adjacent, permanent structural member 71 of the float chamber with shims 72 therebetween for precisely establishing the longitudinal location of the threshold relative to the float chamber.

Referring to FIG. 2, there is shown on the upstream side of the threshold cart an example of an arrangement for establishing the elevation of that side of the cart while providing relative movement in the longitudinal direction to accommodate thermal expansion. It is inadvisable for the delivery section to be rigidly affixed to both the melting furnace structure and the forming chamber structure since there may be relative movement between the two due to thermal expansion or contraction. Since the threshold cart, as shown, is rigidly affixed to the float chamber structure at 71, it is preferred to provide a non-rigid elevational reference point with respect to the melting furnace structure. These connections may be reversed to the opposite sides. The non-rigid connection is achieved by employing a cylinder 75 between opposing upper and lower bearing plates 76 and 77. The upper bearing plate 76 is fastened to the cart structure 21 and the lower bearing plate 77 is fastened to an adjacent melting furnace structural member by way of a bracket 79. The elevation of lower bearing plate 77 may be precisely established by means of shims 78 between the bearing plate 77 and the bracket 79. The bearing plates 76 and 77 are free to move relative to one another in the longitudinal direction.

The structure may be additionally rigidified during operation by bolting the lifting bridge to the dolly structures, as shown in FIGS. 1 and 3. There, the lower flanges of the main structural beams 50 of the lifting bridge are bolted to the dolly structures 61 with shims 80 inserted therebetween to establish the proper elevation for the lifting bridge.

Figure 4:
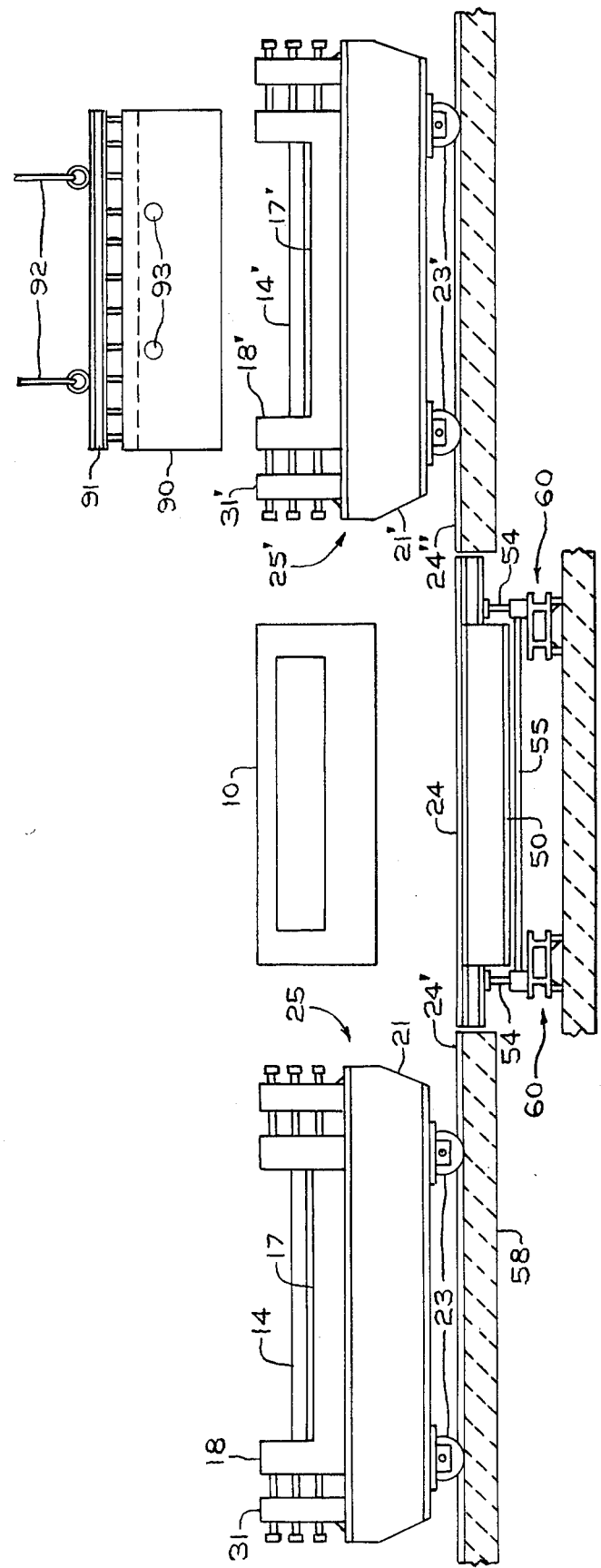
FIG. 4 is a schematic front view of an alternative embodiment employing two threshold carts and preheating means.

When it is desired to remove a threshold, the flow of molten glass from the melting furnace is blocked by means of a water-cooled dam and portions of the refractory structure around the delivery section are removed. Removal of these external refractory pieces can be accomplished without cooling the float chamber. The cart is unbolted from the float chamber structure 71, and the delivery section, including the threshold, may then be broken free of its mounted location by separating the delivery section from the float chamber by moving the entire support structure in the upstream direction on the dolly wheels 62. The lifting bridge beams 50 may then be unbolted from the dollies and the threshold may be raised by means of the jacks 54 to an elevation sufficient to clear the sides of the float chamber basin, and the cart 25 may be rolled along tracks 24 and 24' so that the entire delivery section is brought out onto open floor space 58 adjacent to the glass forming structure as shown in FIG. 4. There, the threshold and its associated structure is readily accessible for maintenance and repair under room temperature conditions. When the repairs have been completed, the procedure may be reversed to set the refurbished delivery section into position.

In FIG. 4, the jacks 54 are shown in the raised position and the threshold cart 25 has been rolled to the side on track 24'. Additionally, there is shown in FIG. 4 an optional feature whereby a second threshold cart rolls on another track section 24" on the opposite side of the delivery section. The track 24" is adapted to be in alignment with the track on the lifting bridge in the raised position so that the cart 25' can be moved into the delivery section when the cart 25 is removed. In this manner a new threshold 17' on cart 25' can be brought into service shortly after a used threshold is removed, without waiting for the threshold structure to be rebuilt on the other cart. By such an arrangement, considerable lost production time (on the order of several days) can be saved.

For installing a threshold while the melting and forming chambers are hot, it is desirable to provide means for preheating the threshold. It is convenient to provide such heating means in connection with the present invention at a station alongside the delivery section where the assembled threshold structure may be preheated on a threshold cart. The heating means may comprise an enclosure into which the threshold cart may be rolled, or it may take the form of a shroud structure that may be lowered over the refractory portions of the threshold structure as depicted in FIG. 4. There, a shroud having a refractory casing 90 is hung on a beam structure 91, which in turn is suspended by cables 92. The shroud may be lowered to cover the new threshold 14', bottom refractory 17', and side walls 18' of the delivery section on the cart. Openings 93 may be provided for inserting gas burners or other heat sources into the enclosure formed by the shroud.

A specific preferred embodiment has been described in detail for the sake of illustrating the invention and for disclosing the best mode, but it should be understood that other variations and modifications as are known to those of skill in the art may be resorted to without departing from the scope of the invention as defined by the claims which follow.

We claim:

1. Apparatus for producing flat glass by the float process comprising: a furnace for melting glass; a forming chamber adapted to hold a pool of molten metal; a delivery section normally aligned between the furnace and the forming chamber, the delivery section having a refractory channel portion adapted to contain a molten glass stream passing from the furnace to the forming chamber and having a threshold member adapted to extend into the forming chamber for supporting and guiding the stream of molten glass passing into the forming chamber, the channel and threshold secured together to form a unitary delivery section structure; a unitary support structure on which the delivery section is mounted, the unitary support structure being independent from the furnace and forming chamber support structures; and jacking means engaging the unitary support structure adapted to transport the unitary support structure and the delivery section carried thereon as a unit into and out of the aligned position between the furnace and the forming chamber.

2. The apparatus of claim 1 further including guide means for providing to the unitary support structure a path of horizontal movement transverse to the direction of glass flow.

3. The apparatus of claim 1 or 2 wherein the jack means is adapted to provide vertical movement to the unitary support structure and the delivery section supported thereon.

4. The apparatus of claim 2 wherein the unitary support structure is provided with wheel means for rolling along the guide means.

5. The apparatus of claim 4 wherein the unitary support structure has associated therewith means for providing horizontal mobility to the delivery section parallel to the direction of glass flow.

6. The apparatus of claim 1 further including means for preheating the delivery section at a preheating station alongside the furnace and forming chamber, and guide means adapted to guide the unitary support structure and delivery section into the preheating station.

7. The apparatus of claim 1 further including a second unitary support structure for carrying a second delivery section and associated with guide means for bringing the second delivery section into alignment between the furnace and the forming chamber.

8. The apparatus of claim 1 wherein said unitary support structure is provided with means for rigidly affixing the unitary support structure in place with the delivery section in its aligned position between the furnace and the forming chamber.

9. The method of installing a threshold in a flat glass melting and forming installation having a melting furnace, forming chamber, and an operating threshold location therebetween, comprising:
on a unitary support structure at a site displaced from the operating location of the threshold, securing the threshold to a refractory channel portion adapted to contain a molten glass stream, thereby creating a unitary delivery section adapted to fit between the melting furnace and the forming chamber;
moving the unitary support structure and the assembled delivery section thereon along guide means to bring the delivery section between the furnace and the forming chamber;
jacking the unitary support structure so as to align the threshold to its operative position; and
affixing the unitary support structure and the delivery section in place with the threshold thereon in the operating location.

10. The method of replacing a threshold in a flat glass melting and forming installation having a melting furnace, a forming chamber, and a delivery zone therebetween, comprising:
securing as a unitary structure on a first support structure in the delivery zone a first threshold and a first refractory channel portion adapted to contain molten glass passing through the delivery zone;
at a location alongside the delivery zone assembling as a unitary structure on a second support structure a second threshold and a second refractory channel portion adapted to contain molten glass passing through the delivery zone;
jacking as a unit the first support structure and the first threshold and first channel portion thereon out of operative engagement with the melting furnace and forming chamber, and removing from the delivery zone as a unit the first support structure and the first threshold and first refractory channel portion carried thereon;
moving as a unit the second support structure and second threshold and second channel portion thereon into the delivery zone, and jacking the second support structure so as to bring the second threshold and second channel portion into operatively aligned positions in the delivery zone; and
affixing the second support structure with the second threshold and second channel portion thereon in place in the delivery zone.

11. The method of claim 9 or 10 wherein the furnace contains molten glass and the forming chamber contains molten tin during the method steps.

* * * * *